United States Patent
Hecht

(10) Patent No.: US 11,819,928 B2
(45) Date of Patent: Nov. 21, 2023

(54) INSERT HOLDER HAVING INSERT RECEIVING RECESS WITH INSERT ORIENTATION PROJECTION AND CUTTING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 289 days.

(21) Appl. No.: 17/335,648

(22) Filed: Jun. 1, 2021

(65) Prior Publication Data

US 2022/0111447 A1 Apr. 14, 2022

Related U.S. Application Data

(60) Provisional application No. 63/091,339, filed on Oct. 14, 2020.

(51) Int. Cl.
*B23B 27/16* (2006.01)
*B23B 31/107* (2006.01)
*B23B 29/04* (2006.01)

(52) U.S. Cl.
CPC .......... *B23B 27/1622* (2013.01); *B23B 29/04* (2013.01); *B23B 31/1075* (2013.01);
(Continued)

(58) Field of Classification Search
CPC ............ B23B 27/1622; B23B 2205/04; B23B 2205/12; B23B 2231/0252; B23B 31/005;
(Continued)

(56) References Cited

U.S. PATENT DOCUMENTS 2,362,053 A 11/1944 Danielson
4,958,966 A * 9/1990 Andrews ............. B23B 31/1075
279/143

(Continued)

FOREIGN PATENT DOCUMENTS

DE 202017005713 1/2018
EP 0 145 985 6/1985
(Continued)

OTHER PUBLICATIONS

International Search Report dated Jan. 14, 2022, issued in PCT counterpart application (No. PCT/IL2021/051121).
(Continued)

*Primary Examiner* — Sara Addisu
(74) *Attorney, Agent, or Firm* — Womble Bond Dickinson (US) LLP

(57) ABSTRACT

A cutting tool includes a cutting insert resiliently clamped in an insert holder. The insert holder includes a forwardly located insert mounting portion that includes an insert receiving recess which extends along a recess axis. The insert holder includes a fastening member through hole opening out to the insert receiving recess. The insert receiving recess includes an insert orientation projection. The fastening member through hole has a through hole angular extent about the recess axis. The insert orientation projection has an insert orientation projection angular extent about the recess axis. The insert orientation projection angular extent at least partially angularly overlaps the through hole angular extent about the recess axis.

39 Claims, 11 Drawing Sheets

(52) U.S. Cl.
CPC ....... *B23B 2205/04* (2013.01); *B23B 2205/12* (2013.01); *B23B 2231/0252* (2013.01); *B23B 2231/24* (2013.01)

(58) Field of Classification Search
CPC . B23B 2231/24; B23B 29/04; B23B 31/1075; B23B 27/007
See application file for complete search history.

(56) References Cited

U.S. PATENT DOCUMENTS

| | | | |
|---|---|---|---|
| 5,080,536 A * | 1/1992 | Andrews | B23B 29/04 |
| | | | 279/145 |
| 5,137,401 A | 8/1992 | Muendlein et al. | |
| 5,873,682 A * | 2/1999 | Tripsa | B23B 31/1075 |
| | | | 407/89 |
| 6,299,180 B1 * | 10/2001 | Satran | B23B 31/1076 |
| | | | 408/233 |
| 6,394,465 B1 | 5/2002 | Guy | |
| 6,565,291 B2 | 5/2003 | Harpaz et al. | |
| 7,112,020 B2 | 9/2006 | Sheffler et al. | |
| 7,891,672 B2 | 2/2011 | Guy | |
| 8,308,403 B2 * | 11/2012 | Hecht | B23B 31/1075 |
| | | | 408/239 R |
| 8,342,539 B2 | 1/2013 | Guy | |
| 8,616,560 B2 | 12/2013 | Guy | |
| 8,656,573 B2 | 2/2014 | Freyermuth et al. | |
| 8,696,270 B2 | 4/2014 | Shitrit et al. | |
| 9,254,525 B2 | 2/2016 | Mizoguchi | |
| 9,505,059 B2 * | 11/2016 | Chen | B23B 29/046 |
| 10,646,925 B2 * | 5/2020 | Nagel | B23B 31/1076 |
| 11,305,359 B2 * | 4/2022 | Kimmich | B23B 29/04 |
| 2004/0161309 A1 * | 8/2004 | Thiele | B23B 31/1076 |
| | | | 407/33 |
| 2004/0253070 A1 * | 12/2004 | Sheffler | B23B 31/1075 |
| | | | 409/234 |
| 2005/0238451 A1 * | 10/2005 | Hartman | B23B 31/1072 |
| | | | 409/234 |
| 2006/0048615 A1 | 3/2006 | Treige | |
| 2012/0126496 A1 | 5/2012 | Volokh | |
| 2016/0107242 A1 * | 4/2016 | McCormick | B23B 31/08 |
| | | | 279/143 |
| 2016/0236282 A1 | 8/2016 | Kitagawa | |
| 2022/0111447 A1 * | 4/2022 | Hecht | B23B 31/1075 |

FOREIGN PATENT DOCUMENTS

| | | |
|---|---|---|
| EP | 2269753 | 1/2011 |
| GB | 2 228 695 | 5/1990 |

OTHER PUBLICATIONS

Written Opinion dated Jan. 14, 2022, issued in PCT counterpart application (No. PCT/IL2021/051121).

* cited by examiner

US 11,819,928 B2

INSERT HOLDER HAVING INSERT RECEIVING RECESS WITH INSERT ORIENTATION PROJECTION AND CUTTING TOOL

RELATED APPLICATIONS

The present application claims priority to U.S. Provisional Patent Application No. 63/091,339, filed Oct. 14, 2020. The contents of the aforementioned application are incorporated by reference in their entirety.

FIELD OF THE INVENTION

The subject matter of the present application relates to cutting tools of the type in which a cutting insert is releasably clamped in an insert receiving recess by a fastening member, and in particular to such tools where the insert receiving recess is configured for allowing the cutting insert to be inserted into the insert receiving recess in a predetermined angular position of the cutting insert.

BACKGROUND OF THE INVENTION

Cutting tools can include an insert holder and a cutting insert releasably and attached in an insert receiving recess. In some such cutting tools the cutting insert is releasably clamped by a fastening member. Examples of such cutting tools are disclosed in, for example, EP 0 145 985, US 2006/048615, US 2016/236282, U.S. Pat. Nos. 2,362,053, 5,137,401 and 7,112,020.

The insert receiving recess in some cutting tools can be configured for allowing the cutting insert to be inserted into the insert receiving recess in a predetermined angular position of the cutting insert. An example of such a cutting tool is disclosed in for example, GB 2 228 695. In some such cutting tools the insert receiving recess can include an insert orientation projection that prevents insertion of a cutting insert into the insert receiving recess unless oriented in a predetermined angular position. Examples of such cutting tools are disclosed in, for example, U.S. Pat. Nos. 8,656,573 and 9,254,525.

SUMMARY OF THE INVENTION

In accordance with a first aspect of the subject matter of the present application there is provided an elongated insert holder having a holder longitudinal axis defining opposite forward to rearward directions, the insert holder comprising:
 a holder peripheral surface extending circumferentially about the holder longitudinal axis, the holder peripheral surface intersecting, and forming a boundary of, a holder forward end surface at a forward end of the insert holder;
 a holder shank portion and an insert mounting portion located at a forward end thereof, the insert mounting portion comprising:
  an insert receiving recess extending along a recess axis and opening out to the holder forward end surface, the insert receiving recess comprising a recess peripheral surface extending circumferentially about the recess axis and an insert orientation projection projecting from the recess peripheral surface into the insert receiving recess; and
  a fastening member through hole opening out to the holder peripheral surface and to the recess peripheral surface and comprising a through hole peripheral surface extending therebetween, wherein:
   in a first recess cross-sectional view taken in a first recess radial plane through the through the fastening member through hole:
    the through hole peripheral surface forms a through hole contour comprising two opposing through hole contour lines; and
    the through hole contour lines intersect the recess peripheral surface at two through hole points, the two through hole points defining a through hole angular extent about the recess axis; and
   in a second recess cross-sectional view taken in a second recess radial plane through the insert orientation projection:
    the insert orientation projection has an insert orientation projection angular extent about the recess axis; wherein:
   the second recess radial plane is axially rearward of the first recess radial plane; and
   the insert orientation projection angular extent at least partially angularly overlaps the through hole angular extent about the recess axis.

In accordance with a second aspect of the subject matter of the present application there is provided a cutting tool comprising:
 an insert holder of the type described above; and
 a cutting insert elongated along an insert longitudinal axis and comprising an insert cutting portion and an insert shank portion axially offset therefrom, wherein:
  the cutting tool is adjustable between:
   an initial position in which:
    the cutting insert is spaced apart from, and axially aligned with, the insert holder's insert receiving recess; and
   a fastened position in which:
    the insert shank portion is located in the insert receiving recess beyond a projection forward end portion of the insert orientation projection in the rearward direction; and
    the cutting insert is releasably clamped in the insert receiving recess by a
   fastening member located in the fastening member through hole.

In accordance with a third aspect of the subject matter of the present application there is provided an elongated insert holder having a holder longitudinal axis defining opposite forward to rearward directions, the insert holder comprising:
 a holder peripheral surface extending circumferentially about the holder longitudinal axis, the holder peripheral surface intersecting, and forming a boundary of, a holder forward end surface at a forward end of the insert holder;
 a holder shank portion and an insert mounting portion located at a forward end thereof, the insert mounting portion comprising:
  an insert receiving recess extending along a recess axis and opening out to the holder forward end surface, the insert receiving recess comprising a recess peripheral surface extending circumferentially about the recess axis and an insert orientation projection projecting from the recess peripheral surface into the insert receiving recess; and
  a fastening member through hole opening out to the holder peripheral surface and to the recess peripheral surface and comprising a through hole peripheral surface extending therebetween, wherein:
   in a first recess cross-sectional view taken in a first recess radial plane through the fastening member through hole:

the through hole peripheral surface forms a through hole contour comprising two opposing through hole contour lines;

the recess peripheral surface comprises a minor peripheral portion extending between the two opposing through hole contour lines; and the insert orientation projection is formed on at least a portion of the minor peripheral portion.

It is understood that the above-said is a summary, and that features described hereinafter may be applicable in any combination to the subject matter of the present application, for example, any of the following features may be applicable to the insert holder or cutting tool:

The fastening member through hole has a through hole width measured between two opposing through hole contour lines. The through hole width can be greatest at the first recess radial plane.

The insert receiving recess can have an imaginary outer cylinder centered at the recess axis and touching a portion of the insert receiving recess furthest from the recess axis. The insert receiving recess can have an imaginary inner cylinder which is concentric with the imaginary outer cylinder and touches a portion of the insert receiving recess closest to the recess axis. In at least one of the first and second recess cross-sectional views, the area bounded between the imaginary inner and outer cylinders can form an annular area, the majority thereof being void.

70% of the annular area can be void.

The imaginary inner cylinder can touch only the insert orientation projection.

The insert orientation projection can comprise two projection side surfaces. In at least one of the first and second recess cross-sectional views, the two projection side surfaces can converge towards each other in a direction from the recess peripheral surface towards the recess axis.

The insert orientation projection angular extent can be defined by the two projection points, the two projection points being the points at which the two projection side surfaces begin to deviate from the imaginary outer cylinder as they converge towards each other.

In at least one of the first and second recess cross-sectional views, the two projection side surfaces can be concavely curved.

The two projection side surfaces can intersect each other at a projection ridge which extends along the recess axis.

The projection ridge can be parallel to the recess axis.

The insert orientation projection angular extent has a projection extent angle at the recess axis. The projection extent angle can be greater or equal to 70° and less than or equal to 110°.

The insert orientation projection can be mirror symmetrical about an axial bisector plane containing the recess axis and bisecting the projection extent angle.

The insert orientation projection can be axially spaced apart from the holder forward end surface.

The fastening member through hole can open out to the recess peripheral surface adjacent the insert orientation projection.

The insert orientation projection can comprise projection forward and rearward end portions and a projection middle portion extending therebetween, the projection forward end portion being located closer to the holder forward end surface than the projection rearward end portion. The fastening member through hole can open out to the recess peripheral surface adjacent the projection forward end portion.

The insert orientation projection can be integrally formed with the insert holder to have unitary one-piece construction therewith.

The insert holder can comprise exactly one fastening member through hole opening out to the holder peripheral surface and the recess peripheral surface.

the insert receiving recess can comprise a plurality of recess abutment projections projecting from the recess peripheral surface opposite the fastening member through hole, the plurality of recess abutment projections being angularly spaced apart from each other and the insert orientation projection about the recess axis, each recess abutment projection comprising a recess abutment surface.

The plurality of recess abutment projections can extend in the forward direction towards the holder forward end surface.

Each recess abutment surface can be planar.

The recess abutment surfaces can extend in the forward-to-rearward direction along the recess axis.

The plurality of recess abutment projections can comprise exactly two recess abutment projections.

In an end view of the insert holder, the exactly two recess abutment surfaces form an abutment clamping angle therebetween, the abutment clamping angle being greater than 45° and less than 135°.

The through hole peripheral surface can comprise an internal threaded portion.

The holder shank portion can comprise at least one shank peripheral coupling arrangement, each shank peripheral coupling arrangement comprising two pairs of diametrically opposite planar shank peripheral abutment surfaces located on the holder peripheral surface, members of each pair being parallel to each other and the holder longitudinal axis.

The at least one shank peripheral coupling arrangement comprises exactly two shank peripheral coupling arrangements oriented at 90° to each other about the holder longitudinal axis.

The fastening member can comprise an external threaded portion. In the fastened position of the cutting tool, the external threaded portion can be threadingly engaged with the internal threaded portion.

The cutting insert can comprise two insert end surfaces and an insert peripheral surface extending therebetween about the insert longitudinal axis. The insert peripheral surface at the insert shank portion can comprise a planar insert shank flat surface which extends to the insert end surface that is located opposite the insert cutting portion thereby forming an insertion cut-out. The insert peripheral surface at the insert shank portion can comprise an insert shank cylindrical surface which lies on an imaginary shank cylinder and which connects opposite circumferential extremities of the insert shank flat surface.

The insert shank flat surface can be parallel to the insert longitudinal axis.

The insert orientation projection can be axially spaced apart from the holder forward end surface. The cutting tool can be further adjustable to a partially inserted position between the initial position and the fastened position, and in the partially inserted position, the insert shank portion can be partially inserted in the insert receiving recess up to a projection forward end portion of the insert orientation projection in the rearward direction.

The cutting tool can be further adjustable to an inserted position between the initial position and the fastened position, and in the inserted position, the insertion cut-out can be angularly aligned with the insert orientation projection about the recess axis. The insert shank portion can be located in the insert receiving recess beyond a projection forward end portion of the insert orientation projection in the rearward direction.

portion of the insert shank cylindrical surface. The fastening member can abut a portion of the insert shank flat surface.

In the fastened position of the cutting tool, the cutting tool can comprise at least one coolant channel formed by a gap between the insert peripheral surface and the recess peripheral surface. The at least one coolant channel can comprise a coolant channel inlet opening and a coolant channel outlet opening which are in fluid communication with each other.

The coolant channel outlet opening can be located at the holder forward end surface.

The cutting tool can be a non-rotary boring bar.

The insert orientation projection can be formed over the entire minor peripheral portion.

The fastening member through hole can have a through hole width measured between two opposing through hole contour lines. The through hole width can be greatest at the first recess radial plane.

BRIEF DESCRIPTION OF THE FIGURES

For a better understanding of the present application and to show how the same may be carried out in practice, reference will now be made to the accompanying drawings, in which:

FIG. 8b is a radial cross-sectional view of the cutting tool taken along the line IIXb-IIXb in FIG. 8a;

Figure 1:
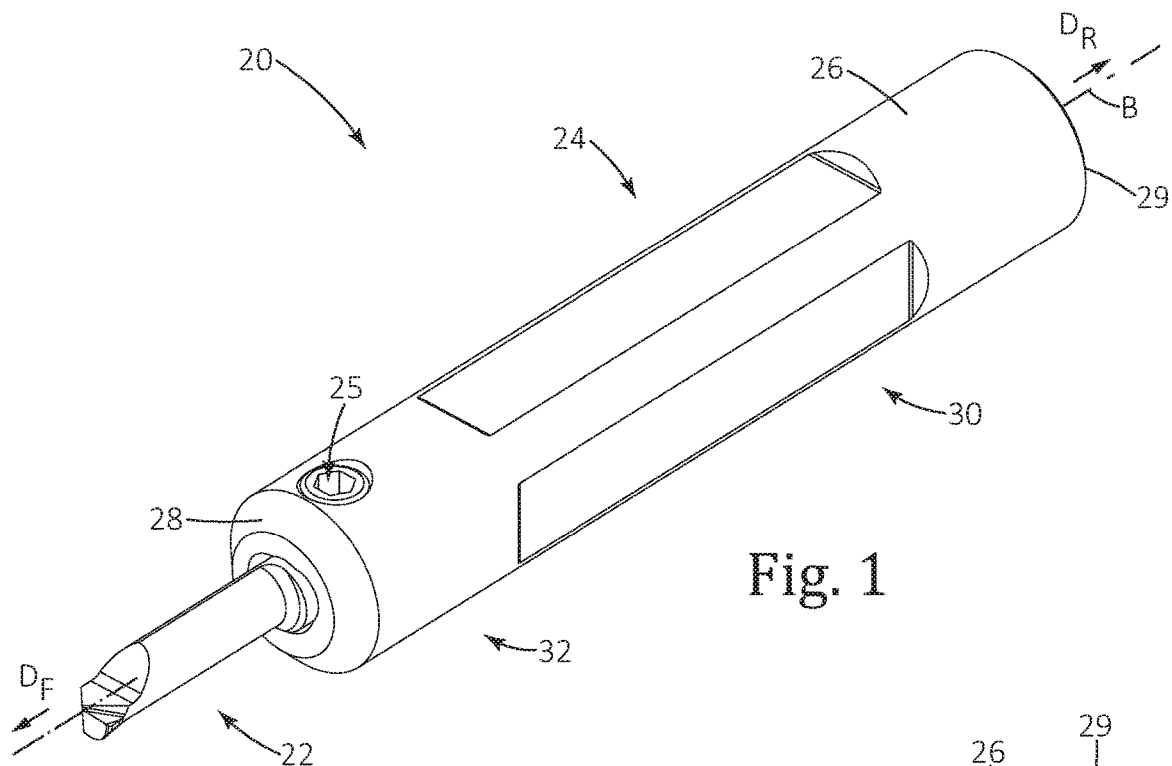
FIG. 1 is a perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 which can be typically made from steel. In this non-limiting example shown in the drawings, the cutting tool 20 is a boring bar and the cutting insert 22 is an elongated internal turning insert. The cutting tool 20 is non-rotary. That is to say, when performing cutting operations, the cutting tool 20 remains fixed (stationary) while the workpiece rotates. The cutting tool 20 is adjustable between a released position and a fastened position. In the fastened position of the cutting tool 20, the cutting insert 22 is releasably attached to the insert holder 24 by a fastening member 25.

Attention is drawn now to FIGS. 3-6b showing an insert holder 24 in accordance with the present application. The insert holder 24 is elongated along a holder longitudinal axis B that defines opposite forward and rearward directions $D_F$, $D_R$. The insert holder 24 includes a holder peripheral surface 26 that extends circumferentially about the holder longitudinal axis B. The holder peripheral surface 26 intersects, and forms a boundary of, a holder forward end surface 28 at a forward end of the insert holder 24. In accordance with some embodiments of the subject matter of the present application, the insert holder 24 can include a holder rearward end surface 29. The holder peripheral surface 26 can extend between the holder forward and rearward surfaces 28, 29. The holder longitudinal axis B can intersect the holder forward and rearward end surfaces 28, 29. It should be appreciated that use of the terms "forward" and "rearward" throughout the description and claims refer to a relative position in a direction of the holder longitudinal axis B towards the left and right, respectively, in FIG. 5.

Figure 2:
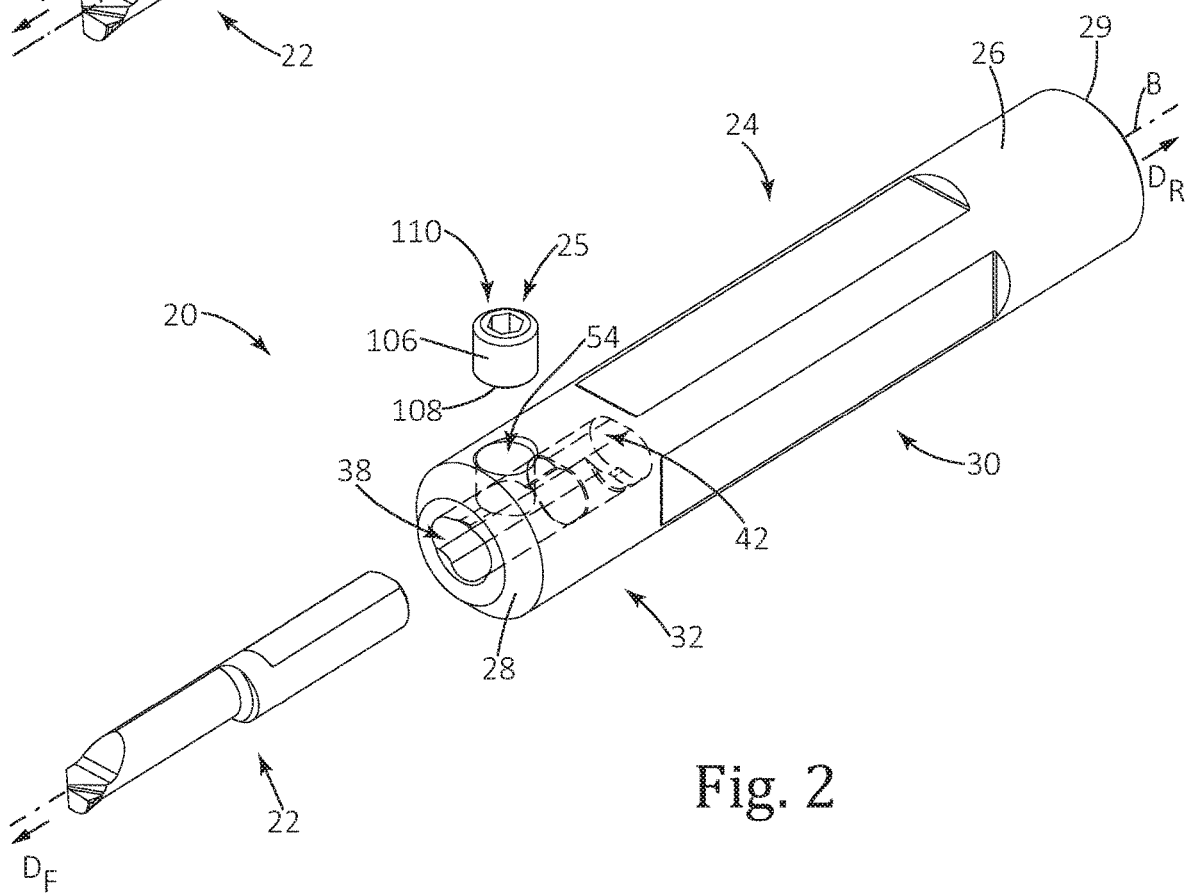
FIG. 2 is an exploded view of the cutting tool shown in FIG. 1 in an initial position.

With further reference to FIG. 2, the insert holder 24 includes a holder shank portion 30 and an insert mounting portion 32 located at a forward end thereof. Both the holder shank portion 30 and the insert mounting portion 32 are defined circumferentially by the holder peripheral surface 26. In accordance with some embodiments of the subject matter of the present application, the holder shank portion 30 and the insert mounting portion 32 can be integrally formed together to have unitary one-piece construction.

Figure 3:
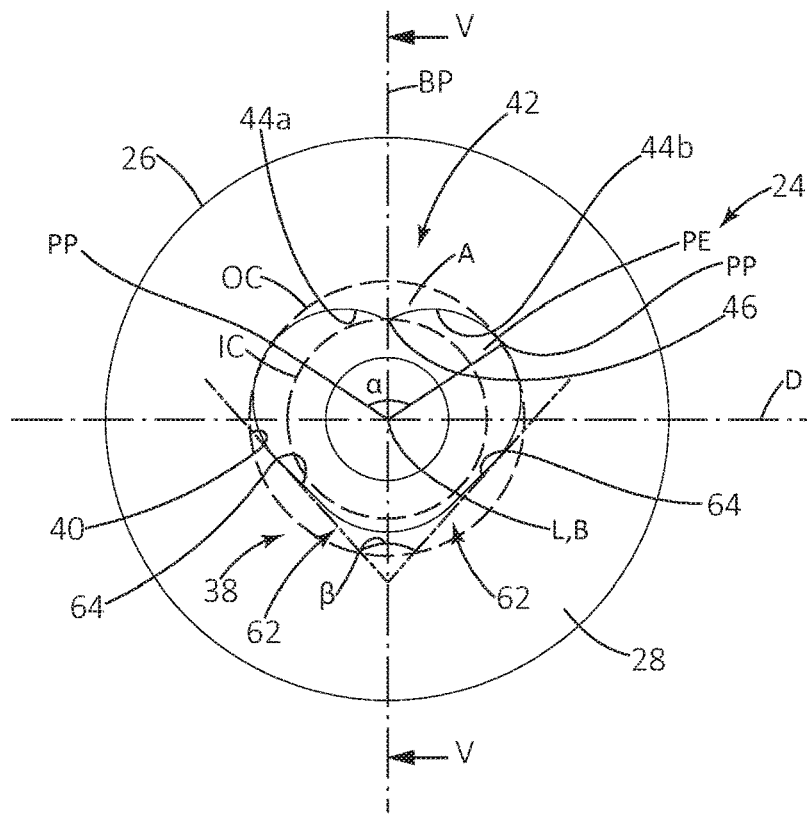
FIG. 3 is a front end view of the insert holder shown in FIG. 2.
Figure 4:
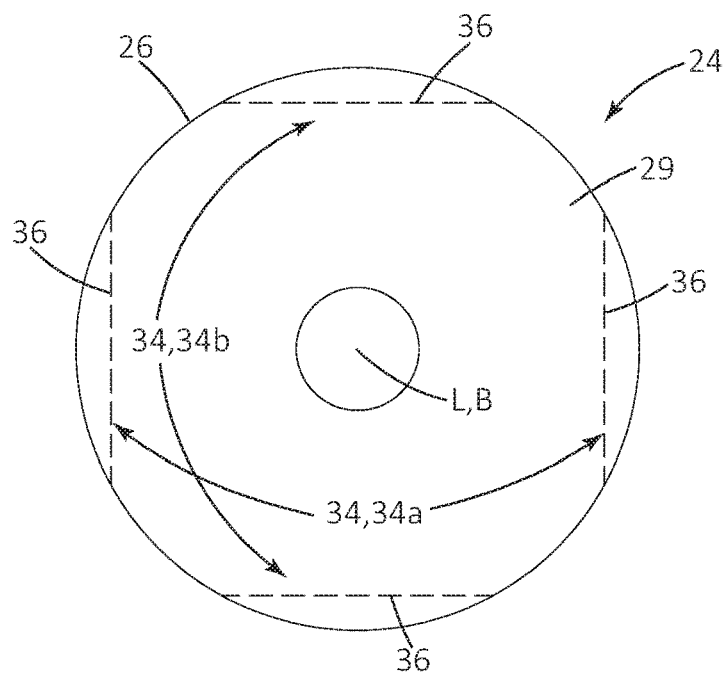
FIG. 4 is a rear end view of the insert holder shown in FIG. 2.

Referring in particular to FIGS. 3 and 4, the holder peripheral surface 26 at the insert mounting portion 32 can be convexly curved. Generally speaking, in this non-limiting example shown in the drawings, the holder peripheral surface 26 can have a cylindrical insert mounting portion cross-section taken in a plane perpendicular to the holder longitudinal axis B through the insert mounting portion 32. The holder peripheral surface 26 at the holder shank portion 30 can also be convexly curved. Moreover, like the insert mounting portion 32, the holder peripheral surface 26 at the holder shank portion 30 can have a cylindrical shank portion cross-section taken in a plane perpendicular to the holder longitudinal axis B through the holder shank portion 30. The holder peripheral surface 26 as seen in the insert mounting portion cross-section and the holder to shank portion cross-section can be identical notwithstanding the fastening member through hole and the shank peripheral coupling arrangement described later in the description.

Referring to FIG. 4, in accordance with some embodiments of the subject matter of the present application, the holder shank portion 30 can include at least one shank peripheral coupling arrangement 34. Each shank peripheral coupling arrangement 34 serves to provide a secure and rigid coupling with a tool holder (not shown). Each shank peripheral coupling arrangement 34 can include two pairs of diametrically opposite planar shank peripheral abutment surfaces 36 located on the holder peripheral surface 26. Members of each pair of shank peripheral abutment surfaces 36 can be parallel to each other and to the holder longitudinal axis B. The at least one shank peripheral coupling arrangement 34 can include exactly two shank peripheral coupling arrangements 34a, 34b oriented at 90° to each other about the holder longitudinal axis B (that is angularly offset, i.e. rotated, by 90°). Advantageously this allows the insert holder 24 to be mounted to the tool holder in two different orientations.

Referring to FIGS. 3 and 5-6b, the insert mounting portion 32 includes an insert receiving recess 38. The insert receiving recess 38 is designed to receive the cutting insert 22. The insert receiving recess 38 extends along a recess axis L. The insert receiving recess 38 opens out to the holder forward end surface 28. The insert receiving recess 38 includes a recess peripheral surface 40 which extends circumferentially about the recess axis L. The recess peripheral surface 40 faces radially inwards. The insert receiving recess 38 includes a generally forward facing recess stopper surface 41 for locating the cutting insert 22 in a defined axial position. The insert receiving recess 38 has a recess length R between the holder forward end surface 28 and the recess stopper surface 41 as measured in a direction parallel to the recess axis L. In accordance with some embodiments of the subject matter of the present application, the insert receiving recess 38, and the recess peripheral surface 40, can be rotationally asymmetrical about the recess axis L. The recess axis L can be co-incident with the holder longitudinal axis B.

Referring to FIG. 3, the insert receiving recess 38 includes an insert orientation projection 42 which projects radially inwardly from the recess peripheral surface 40 into the insert receiving recess 38. Generally speaking, the insert orientation projection 42 projects towards the recess axis L. The insert orientation projection 42 serves to allow insertion of the cutting insert 22 into the insert receiving recess 38 beyond a forward end of the insert orientation projection 42 in the rearward direction $D_R$ (so that the cutting insert 22 can be releasably retained in the insert receiving recess 38, with the cutting insert's cutting edge being angularly located in a correct position for cutting operations) only in a predetermined angular position (i.e. orientation) of the cutting insert 22 relative to the insert holder 24, as described later in the description. Stated differently, the insert holder 24 is foolproof (i.e. the cutting insert 22 cannot be retained in the insert receiving recess 38 in such a way that its cutting edge is in an incorrect position for cutting operations when the cutting tool 20 is in the fastened portion). It is noted that the predetermined angular position can be defined by an angular range (about an insert longitudinal axis A) which allows insertion of the cutting insert 22 into the insert receiving recess 38. The insert orientation projection 42 also serves to prevent rotation of the cutting insert 22 once it is inserted beyond the forward end of the insert orientation projection 42 in the rearward direction $D_R$ (i.e. when the cutting tool 20 is in an inserted position). This ensures that the cutting insert 22 remains in the predetermined angular position when the fastening member 25 is actuated for clamping the cutting insert 22.

In accordance with some embodiments of the subject matter of the present application, the insert orientation projection 42 can be integrally formed with the insert holder 24 to have unitary one-piece construction therewith. Thus, advantageously no assembly of the insert holder 24 is required after its manufacture.

Figure 5:
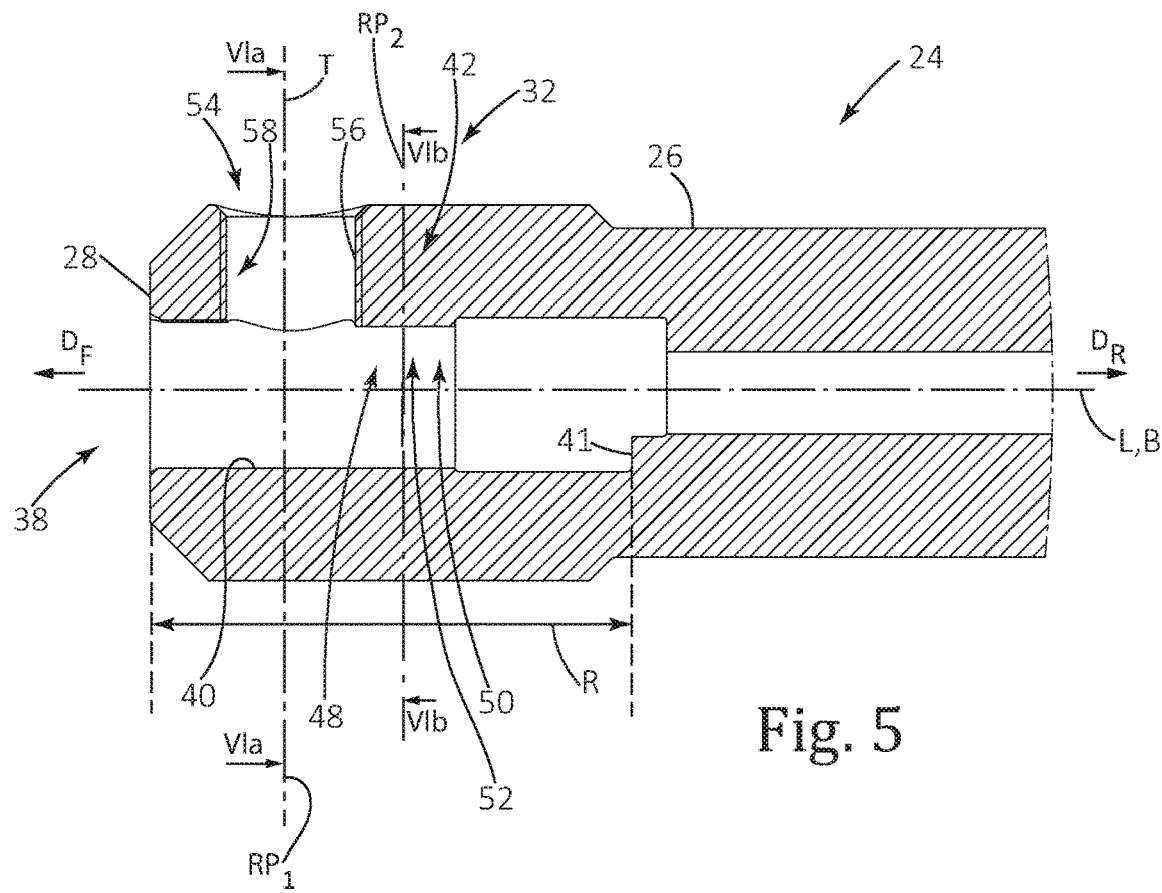
FIG. 5 is a cross-sectional view of the insert holder taken along line V-V in FIG. 3.

Referring to FIG. 5, in accordance with some embodiments of the subject matter of the present application, the insert orientation projection 42 can be axially spaced apart from the holder forward end surface 28. Advantageously, this allows the cutting insert 22 to be partially inserted i.e. up to, but not beyond, the forward end of the insert orientation projection 42 in the rearward direction $D_R$) into the insert receiving recess 38 as described further on in the description.

Figure 6A:
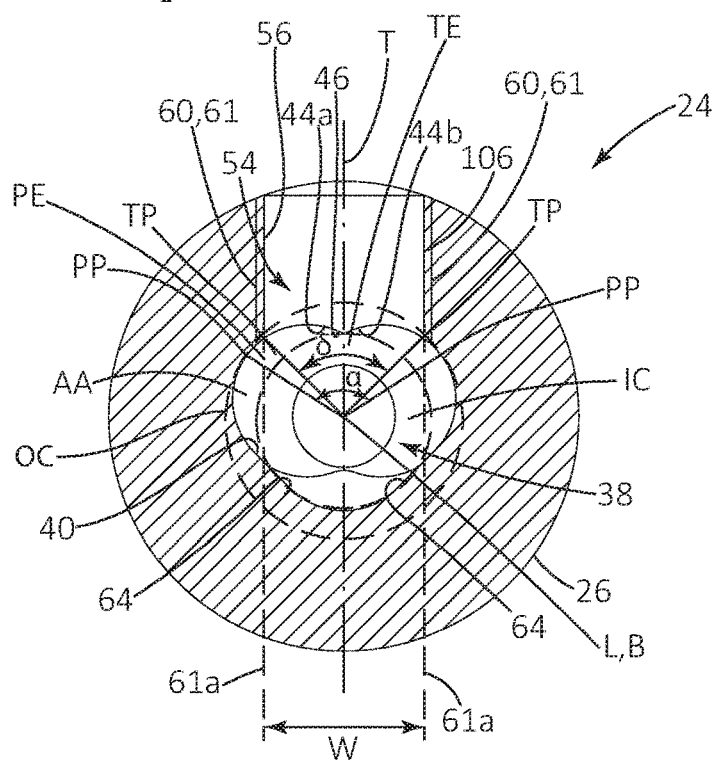
FIG. 6a is the first recess cross-sectional view of the insert holder taken along line VIa-VIa in FIG. 5.
Figure 6B:
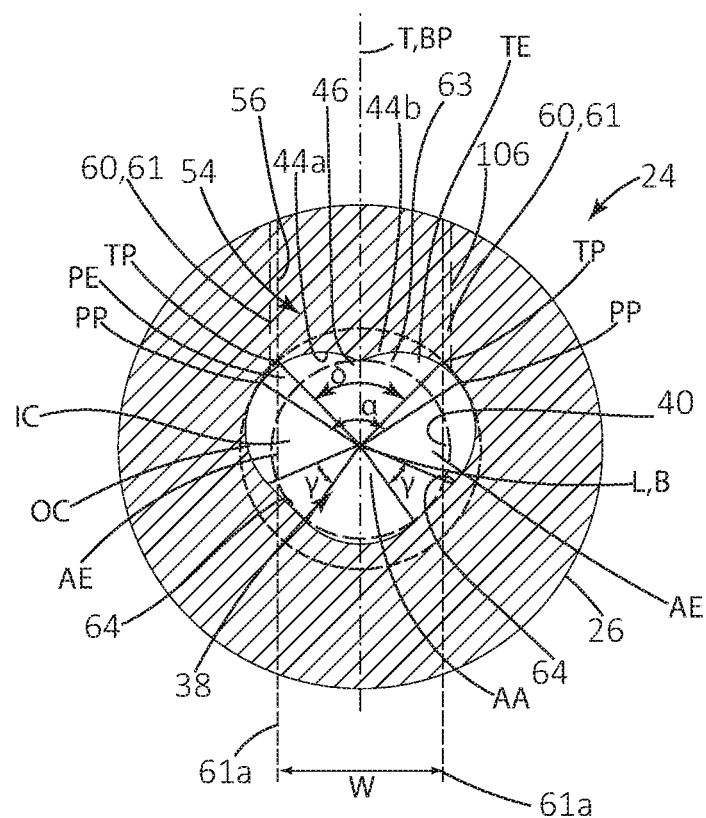
FIG. 6b is a second recess cross-sectional view of the insert holder taken along line VIb-VIb in FIG. 5, with through hole contour lines superimposed thereupon.

Alternatively, the insert orientation projection 42 can be located axially adjacent the holder forward end surface 28 (not shown). It is noted that, as discussed above, in both configurations, only in the predetermined angular position of the cutting insert 22 can the cutting insert 22 be inserted into the insert receiving recess 38 beyond the forward end of the insert orientation projection 42. Referring to FIGS. 6a and 6b, in accordance with some embodiments of the subject matter of the present application, as seen in a first recess cross-sectional view taken in a first recess radial plane $RP_1$ through the fastening member through hole 54 (FIG. 6a), or in a second recess cross-sectional view taken in a second recess radial plane $RP_2$ through the insert orientation projection 42 (FIG. 6b), the periphery of the insert receiving recess 38 is devoid of any drilled radiused grooves designed to act as cooling channels as disclosed, for example, in U.S. Pat. No. 6,059,296. It is understood that the first and second recess radial planes $RP_1$, $RP_2$ are perpendicular to the recess axis L with the second recess radial plane $RP_2$ being axially rearward of the first recess radial plane $RP_1$. It is also noted that the manufacturing of the insert receiving recess 38 requires no internal grinding or drilling. Manufacture of the insert holder 24 is thus simple and cheap.

Referring to FIGS. 3 and 6a, 6b, in accordance with some embodiments of the subject matter of the present application, the insert orientation projection 42 can include two projection side surfaces, a first projection side surface and a second projection side surface 44a, 44b. The first projection side surface 44a can extend from the recess peripheral surface 40 towards the second projection side surface 44b and vice versa. In at least one of the first and second recess cross-sectional views (i.e. FIGS. 6a & 6b), the two projection side surfaces 44a, 44b can converge towards each other in a direction from the recess peripheral surface 40 towards the recess axis L. The two projection side surfaces 44a, 44b can be concavely curved. The two projection side surfaces 44a, 44b can intersect each other. The two projection side surfaces 44a, 44b can intersect each other at a projection ridge 46. The projection ridge 46 can form an axially extending edge. The projection ridge 46 can axially extend parallel to the recess axis L.

As seen in FIG. 5, in accordance with some embodiments of the subject matter of the present application, the insert orientation projection 42 can include a projection forward end portion 48, a projection rearward end portion 50 and a projection middle portion 52 which extends therebetween. The projection forward end portion 48 is located closer to the holder forward end surface 28 than the projection rearward end portion 50. The two projection side surfaces 44a, 44b and the projection ridge 46 can extend between the projection forward and rearward end portions 48, 50.

In accordance with some embodiments of the subject matter of the present application, referring to FIGS. 3 and 6a, 6b, the insert receiving recess 38 can have an imaginary outer cylinder OC centered (i.e. having its axis) at the recess axis L. The imaginary outer cylinder OC can touch a portion of the insert receiving recess 38 furthest from the recess axis L. In this non-limiting example shown in the drawings, the imaginary outer cylinder OC can touch two portions of the insert receiving recess 38 on either side of the insert orientation projection 42. The insert receiving recess 38 can have an imaginary inner cylinder IC which is concentric with the imaginary outer cylinder OC and touches a portion of the insert receiving recess 38 closest to the recess axis L. In this non-limiting example shown in the drawings, the imaginary inner cylinder IC can touch only the insert orientation projection 42. Thus, the insert orientation projection 42 can be closer to the recess axis L than the remainder of the insert receiving recess 38. In particular, the imaginary inner cylinder IC can touch only the projection ridge 46. In at least one of the first and second recess cross-sectional views, the area bounded between the imaginary inner and outer cylinders IC, OC forms an annular area AA. The majority of the annular area AA can be void (i.e. devoid of material). In particular, 70% of the annular area AA can be void.

In the second recess cross-sectional view (FIG. 6b), the insert orientation projection 42 defines an insert orientation projection angular extent PE about the recess axis L. The insert orientation projection 42 extends in a circumferential direction between two projection points PP. Specifically, the two projection points PP define the projection angular extent PE about the recess axis L. In accordance with some embodiments of the subject matter of the present application, the two projection points PP can be the points at which the two projection side surfaces 44a, 44b begin to deviate from the imaginary outer cylinder OC as they converge towards each other (where the two projection points PP are located on the imaginary outer cylinder OC). That is to say, the insert orientation projection 42 can project radially inwardly from the imaginary outer cylinder OC. The insert orientation projection angular extent PE has a projection extent angle α at the recess axis L. Stated differently, the two projection points PP can subtend the projection extent angle α from the recess axis L. The projection extent angle α can be greater or equal to 70° and less than or equal to 110°. The insert orientation projection 42 can be mirror symmetrical about an axial bisector plane BP which contains the recess axis L and bisects the projection extent angle α. Likewise, the insert receiving recess 38 can be mirror symmetrical about the axial bisector plane BP.

The insert mounting portion 32 includes a fastening member through hole 54 which opens out to the holder peripheral surface 26 and to the recess peripheral surface 40. The fastening member through hole 54 is designed for receiving the fastening member 25 so that the fastening member 25 can press against, and clamp, the cutting insert 22. In accordance with some embodiments of the subject matter of the present application, the insert mounting portion 32 can include exactly one fastening member through hole 54 opening out to the holder peripheral surface 26 and the recess peripheral surface 40. The fastening member through hole 54 can open out to the recess peripheral surface 40 adjacent the insert orientation projection 42, just axially forward thereof. Preferably, the fastening member through hole 54 can open out to the recess peripheral surface 40 adjacent the projection forward end portion 48. Advantageously, by such a configuration, the insert holder 24 is strengthened in a region where it is weakened by removal of material required for the fastening member through hole 54. In such a configuration the fastening member through hole 54 is located between the holder forward end surface 28 and the insert orientation projection 42.

The fastening member through hole 54 extends along a through hole axis T. In accordance with some embodiments of the subject matter of the present application, the through hole axis T can be oriented perpendicular to the recess axis L and intersect the recess axis L. The through hole axis T can be contained in the axial bisector plane BP.

The fastening member through hole 54 includes a through hole peripheral surface 56 which extends between the holder peripheral surface 26 and the recess peripheral surface 40. The through hole peripheral surface 56 extends circumferentially about the through hole axis T. In accordance with some embodiments of the subject matter of the present application, the through hole peripheral surface 56 can include an internal threaded portion 58, for threadingly engaging a corresponding threaded portion on the fastening member 25.

Referring to FIG. 6a, in accordance with some embodiments of the subject matter of the present application, in the first recess cross-sectional view, the through hole peripheral surface 56 forms a through hole contour 60 including two opposing through hole contour lines 61. The two through hole contour lines 61 are located either side of the through hole axis T. Each through hole contour line 61 extends to (intersects) the recess peripheral surface 40 at a respective one of the two through hole points TP. The two through hole points TP define a through hole angular extent TE about the recess axis L. The through hole angular extent TE has a through bore extent angle δ at the recess axis L. Each through hole contour lines 61 extends along a respective imaginary through hole lines 61a. The fastening member through hole 54 has a through hole width W, measured between two opposing through hole contour lines 61 (and thus between projected imaginary through hole lines 61a).

The through hole width W is measured perpendicular to the recess axis L and the through bore axis T. The recess peripheral surface 40 includes a minor peripheral portion 63 which extends between the two opposing through hole contour lines 61. Stated differently, the minor peripheral portion 63 is located between the two through hole points TP. It is understood that a minor peripheral portion of the recess peripheral surface 40 is a portion whose angular extent about the recess axis L is less than that of the remaining (major) portion of the recess peripheral surface 40.

In the first recess cross-sectional view (i.e. FIG. 6*a*), the insert orientation projection 42 is formed on at least a portion of the minor peripheral portion 63. In accordance with some embodiments of the subject matter of the present application, the insert orientation projection 42 can be formed over the entire minor peripheral portion 63. The first recess radial plane $RP_1$ can be located where the fastening member through hole 54 has its maximum width. That is to say, the through hole width W can be greatest at the first recess radial plane $RP_1$. The first recess radial plane $RP_1$ can contain the through hole axis T.

The insert orientation projection angular extent PE at least partially angularly overlaps the through hole angular extent TE about the recess axis L. In this non-limiting example shown in the drawings, the through hole angular extent TE is contained fully within the insert orientation projection angular extent PE. Stated differently, the insert orientation projection angular extent PE fully angularly overlaps the through hole angular extent TE about the recess axis L. In such a configuration the through bore extent angle δ is less than the projection extent angle α.

Figure 8A:
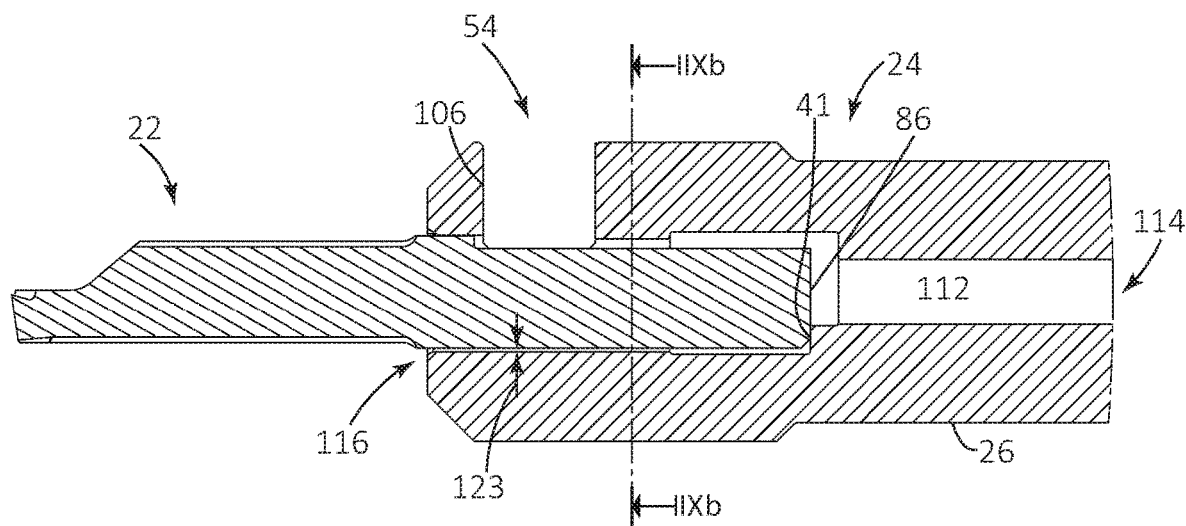
FIG. 8a is a longitudinal cross-sectional view of the cutting tool in an inserted position.
Figure 8B:
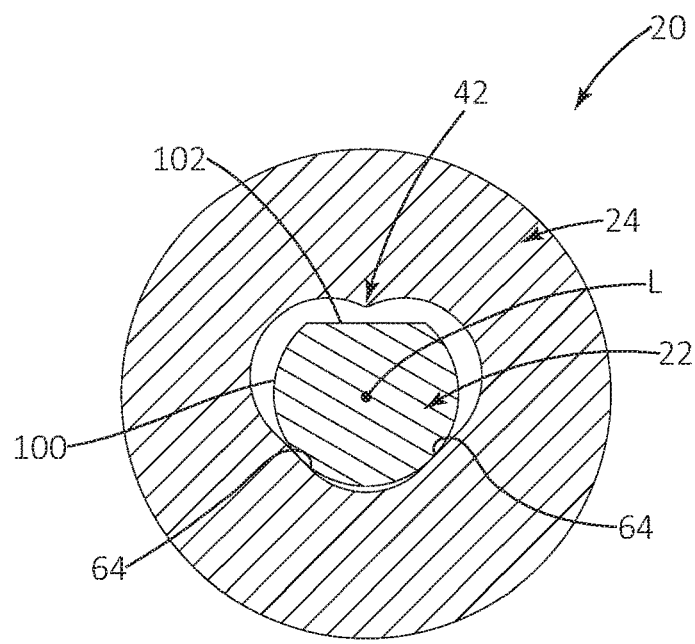

Referring to FIG. 3, in accordance with some embodiments of the subject matter of the present application, the insert receiving recess 38 can include a plurality of recess abutment projections 62 projecting from the recess peripheral surface 40 opposite the fastening member through hole 54. The plurality of recess abutment projections 62 are designed to abut corresponding surfaces on the cutting insert 22. The plurality of recess abutment projections 62 are located on the opposite side of a diameter plane D from the insert orientation projection 42, where the diameter plane D is perpendicular to the axial bisector plane BP in an end view of the tool holder 24 and extends through the diameter of the imaginary outer cylinder OC. Generally speaking, the plurality of recess abutment projections 62 project towards the recess axis L. As seen in FIG. 8*b*, the plurality of recess abutment projections 62 can extend in the forward direction $D_F$ towards the holder forward end surface 28.

Reverting to FIG. 3, in accordance with some embodiments of the subject matter of the present application, the plurality of recess abutment projections 62 can be angularly spaced apart from each other and the insert orientation projection 42 about the recess axis L.

In accordance with some embodiments of the subject matter of the present application, each recess abutment projection 62 can include a recess abutment surface 64, for abutting a corresponding surface on the cutting insert 22. The recess abutment surfaces 64 may be symmetric about the axial bisector plane BP. Each recess abutment surface 64 can be planar. The recess abutment surfaces 64 can extend in the forward-to-rearward direction $D_F$, $D_R$ along the recess axis L. Each recess abutment surface 64 can include two recess abutment sub-surfaces (not shown) axially spaced apart from one another along the recess axis L by a recessed surface (also not shown). In the axial direction, the fastening member through hole 54 can be located between the two recess abutment sub-surfaces. Each recess abutment surface 64 can define an abutment surface angular extent AE about the recess axis L. The abutment surface angular extent AE has an abutment surface extent angle γ at the recess axis L.

In accordance with some embodiments of the subject matter of the present application, the plurality of recess abutment projections 62 can include exactly two angularly spaced apart recess abutment projections 62. As seen in FIG. 3, the exactly two recess abutment surfaces 64 can form an abutment clamping angle β therebetween. The abutment clamping angle β can be greater than 45° and less than 135°. This provides a strong and accurate mounting of the cutting insert 22 in the insert receiving recess 38. Each adjacent insert orientation projection 42 and recess abutment surface 64 can be angular spaced apart about the recess axis L.

Figure 12:
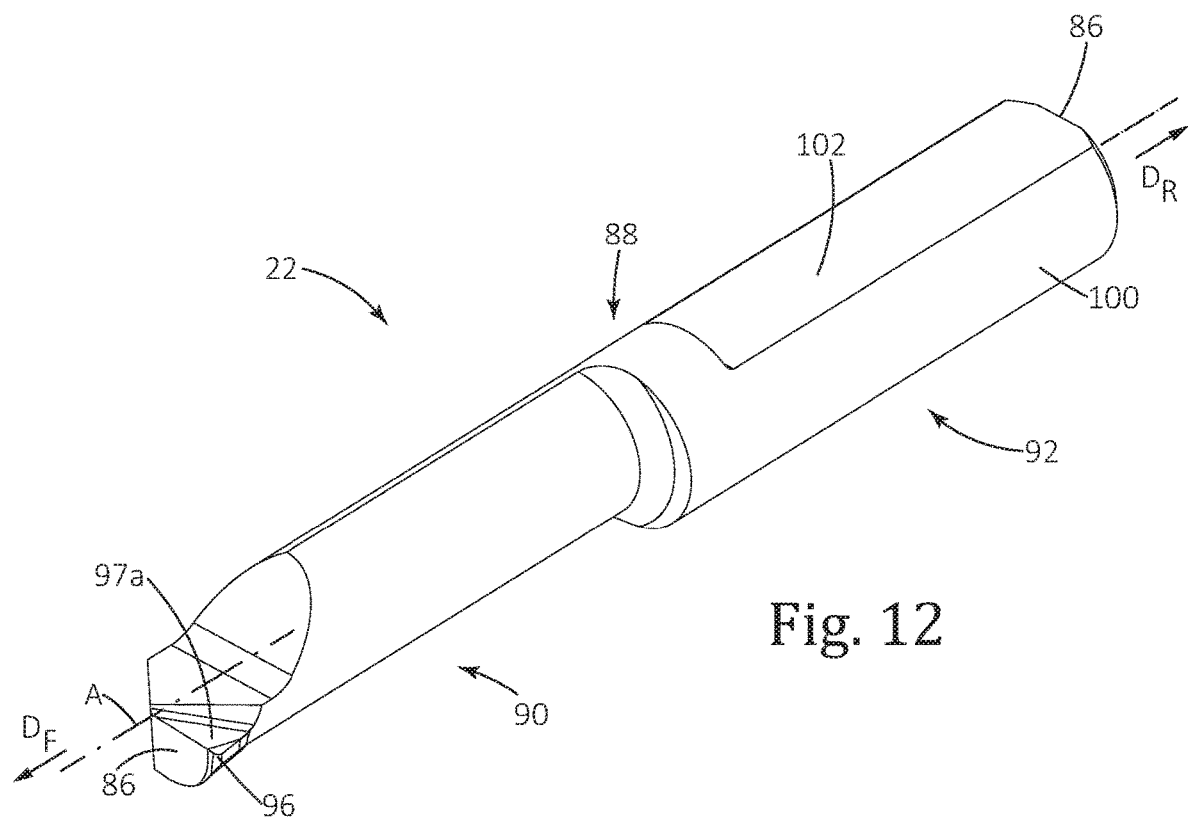
FIG. 12 is a perspective view of a cutting insert shown in FIG. 2.
Figure 13:
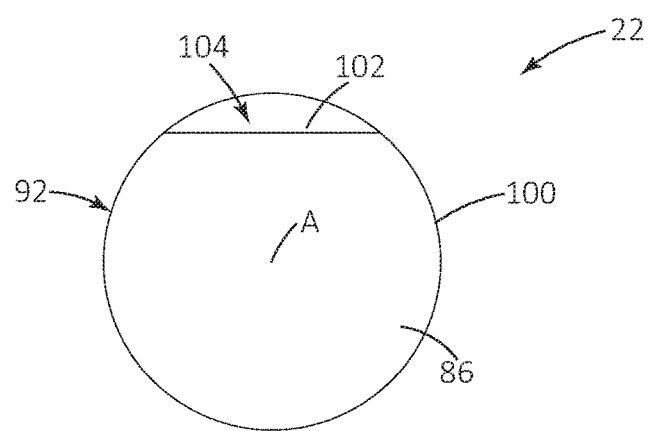
FIG. 13 is a rear end view of the cutting insert shown in FIG. 12.
Figure 14:
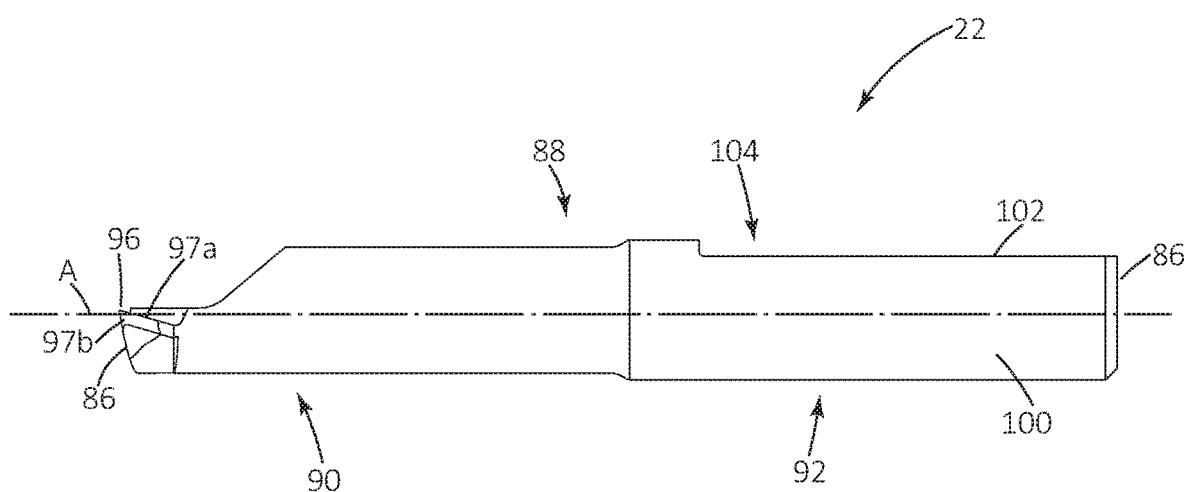
FIG. 14 is a side view of the cutting insert shown in FIG. 12.

Reference is now made to FIGS. 12 to 14, showing the cutting insert 22, in accordance with the subject matter of a second aspect of the present application. The cutting insert 22 is integrally formed to have a unitary one-piece construction. The cutting insert 22 includes two opposing insert end surfaces 86 and an insert peripheral surface 88 extending between the two insert end surfaces 86. The insert peripheral surface 88 intersects, and forms a boundary of, the two insert end surfaces 86. The insert peripheral surface 88 extends circumferentially about an insert longitudinal axis A. The insert longitudinal axis A defines a length direction of the cutting insert 22, i.e., the direction in which the cutting insert 22 is elongated and has its longest dimension. In accordance with some embodiments of the subject matter of the present application, the cutting insert 22 can be devoid of a through hole, for accommodating a retaining screw.

The cutting insert 22 includes an insert cutting portion 90 and an insert shank portion 92 axially offset therefrom. The insert cutting portion 90 is located at the forward end of the cutting insert 22. In the embodiment shown, the insert cutting portion 90 is eccentrically oriented relative to the insert shank portion 92. In other words, the insert cutting portion 90 and the insert shank portion 92 are not connected at the latter's center.

The insert cutting portion 90 includes a cutting edge 96 formed at the intersection of a rake surface 97*a* and a relief surface 97*b*. The cutting edge 96 is oriented to perform internal grooving or boring.

Referring to FIG. 13, in accordance with some embodiments of the subject matter of the present application, the insert peripheral surface 88 at the insert shank portion 92 can include a planar insert shank flat surface 102. The insert shank flat surface 102 can extend to the insert end surface 86 that is located opposite the insert cutting portion 90 thereby forming an insertion cut-out 104. The insert shank flat surface 102 can be parallel to the insert longitudinal axis A. The insert peripheral surface 88 at the insert shank portion 92 can include an insert shank cylindrical surface 100 which lies on an imaginary cylinder having the insert longitudinal axis A as its central axis. The insert shank cylindrical surface 100 can connect opposite circumferential extremities of the insert shank flat surface 102. Thus, the insertion cut-out 104 may constitute a chord-like surface 102 formed on the cylindrical shank portion 92. Cutting inserts of the type described above are known in the art. For example, DE202017005713 U1 discloses such a cutting insert. The insert receiving recess 38 can be configured to receive different cutting inserts 22 having insert shank portions 92 with different lengths by use of spacers.

Reference is now reverted to FIG. 2. In accordance with some embodiments of the subject matter of the present application, the fastening member 25 can include an external threaded portion 106. The fastening member 25 can be a clamping screw. The fastening member 25 can include a fastening member end abutment surface 108 and a fastening member actuating portion 110 located on either side of the external threaded portion 106. The fastening member actuating portion 110 is designed to receive a key, such as an Allen key, in order move the fastening member 25 along the through hole axis T. The fastening member end abutment surface 108 is designed to clampingly engage the cutting insert 22. The fastening member end abutment surface 108 can be planar.

Reference is now made to FIGS. 7 to 11, showing the cutting tool 20, in accordance with the subject matter of a third aspect of the present application. The cutting tool 20 is adjustable between an initial position and a fastened position.

In the initial position of the cutting tool 20 (i.e. FIG. 2) the cutting insert 22 is spaced apart from, and axially aligned with, the insert holder's insert receiving recess 38, in preparation for insertion into the latter.

In the configuration where the insert orientation projection 42 is axially adjacent the holder forward end surface 28 (not shown), the cutting insert 22 can be prevented from being inserted into the insert receiving recess 38 by the insert orientation projection 42.

Figure 7:
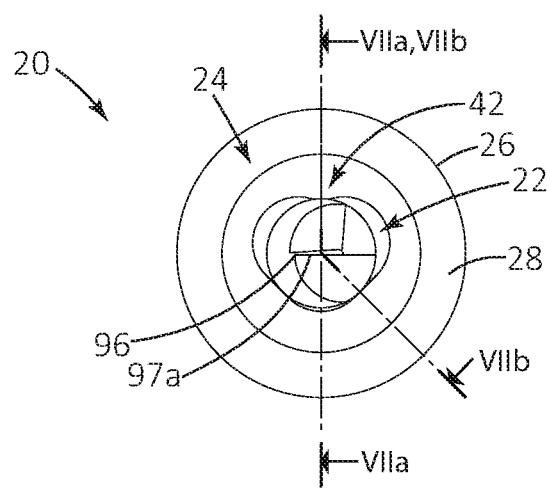
FIG. 7 is a front end view of the cutting tool shown in FIG. 1 in a partially inserted position.
Figure 7A:
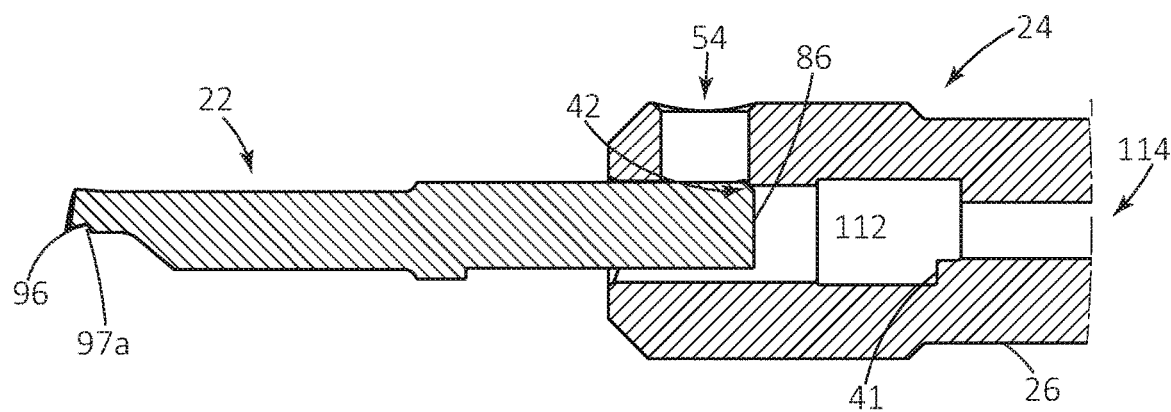
FIG. 7a is a cross-sectional view of the cutting tool taken along the line VIIa-VIIa in FIG. 7, and showing a cutting insert being obstructed in a rearward direction by an insert orientation projection.
Figure 7B:
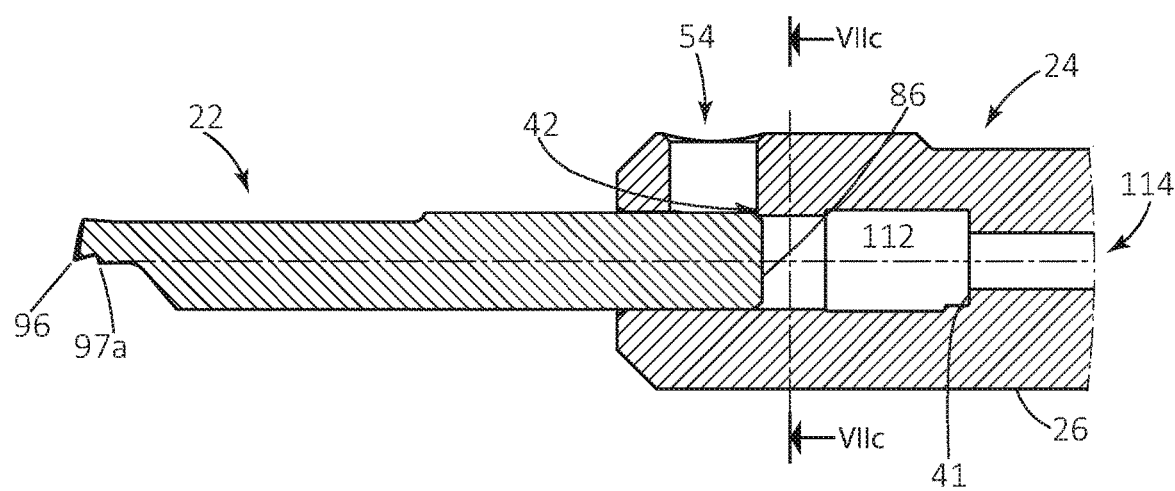
FIG. 7b is a cross-sectional view of the cutting tool taken along the line VIIb-VIIb in FIG. 7.
Figure 7C:
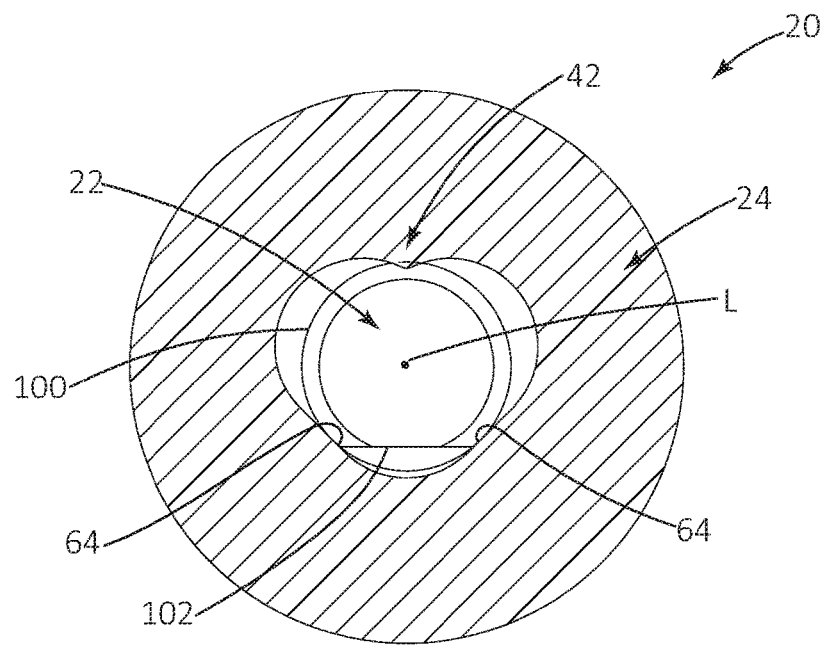
FIG. 7c is a cross-sectional view of the cutting tool taken along the line VIIc-VIIc in FIG. 7.

Referring to FIGS. 7-7c, in the configuration where the insert orientation projection 42 is axially spaced apart from the holder forward end surface 28, the cutting insert 22 can be partially inserted (up to, i.e. adjacent, but not beyond, the projection forward end portion 48 of the insert orientation projection 42 in the rearward direction $D_R$) into the insert receiving recess 38, defining a partially inserted position of the cutting tool 20. Advantageously, once partially inserted, the cutting insert 22 may not easily fall from the insert holder 24. Moreover, the cutting insert 22 may be prevented from being further inserted into the insert receiving recess 38 by the insert orientation projection 42. In this non-limiting example shown in the FIGS. 7a-7c, the cutting insert 22 is "upside-down" (i.e. the insertion cut-out 104 is angularly offset from the insert orientation projection 42 by 180°.

From the initial or partially inserted position, if required, the cutting insert 22 is rotated about its longitudinal axis such that the insertion cut-out 104 is positioned adjacent and angularly aligned with the insert orientation projection 42 (i.e. the predetermined angular position is realized). The insert shank portion 92 is then inserted into the insert receiving recess 38 beyond the projection forward end portion 48 of the insert orientation projection 42 in the rearward direction $D_R$ until the insert end surface 86 at the insert shank portion 92 contacts the recess stopper surface 41. This results in an inserted position of the cutting tool 20 (FIG. 8a).

Figure 8C:
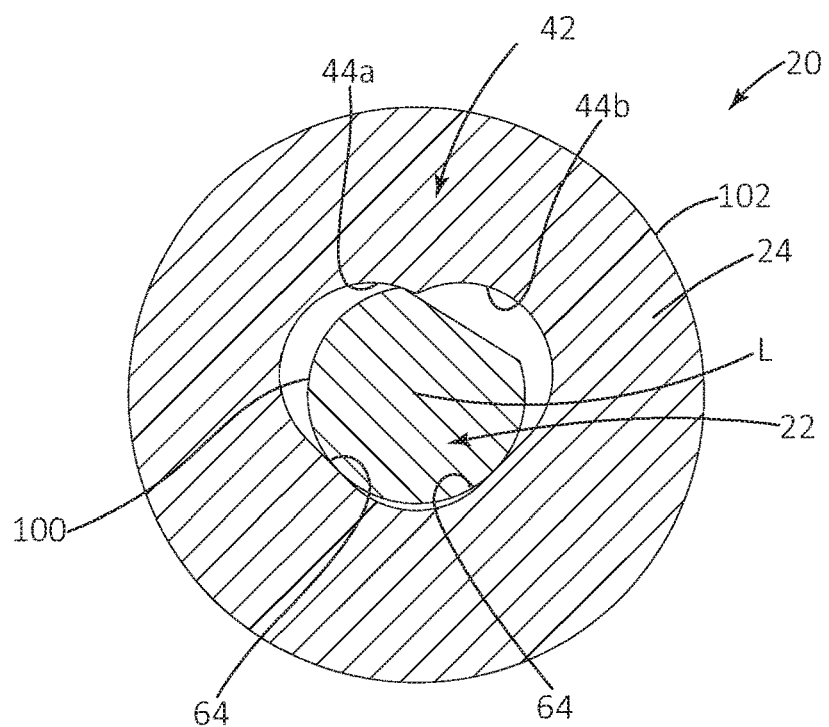
FIG. 8c is another radial cross-sectional view of the cutting tool taken along the line IIXb-IIXb, after rotation of the cutting insert, and showing the cutting insert being obstructed in a rotational direction by the insert orientation projection.

Referring to FIG. 8b, in the inserted position of the cutting tool 20, the insert shank flat surface 102 can face the insert orientation projection 42. The insert orientation projection 42 can be located in the insertion cut-out 104. The fastening member 25 is not located in the fastening member through hole 54 (or at least does not protrude into the insert receiving recess 38). As shown in FIG. 8c, the insert orientation projection 42 prevents rotation of the cutting insert 22 about the insert longitudinal axis A. In accordance with some embodiments of the subject matter of the present application, a portion of the insert shank flat surface 102 can be spaced apart from the insert orientation projection 42. Portions of the insert shank cylindrical surface 100 can be in contact with the recess abutment surfaces 64.

Figure 9:
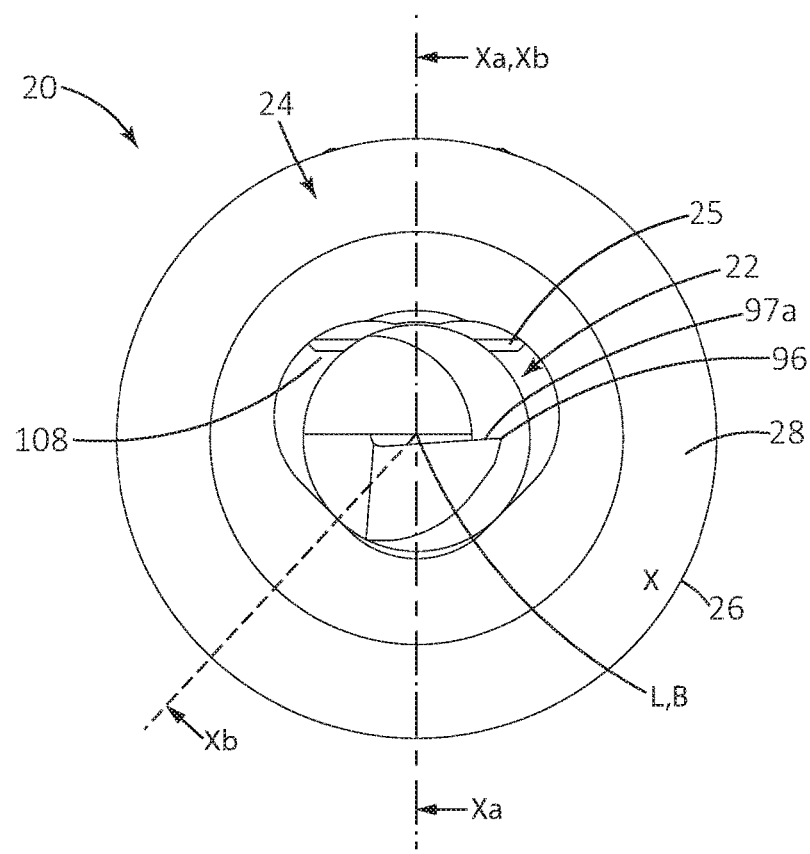
FIG. 9 is a front end view of the cutting tool shown in FIG. 1 in a fastened position.
Figure 10A:
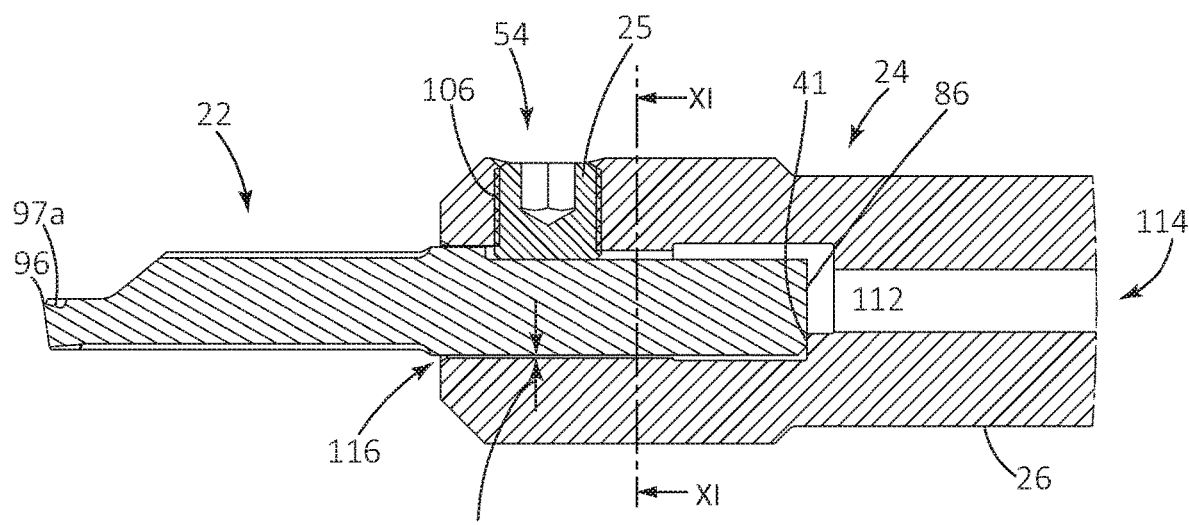
FIG. 10a is a cross-sectional view of the cutting tool taken along the line Xa-Xa in FIG. 9.
Figure 10B:
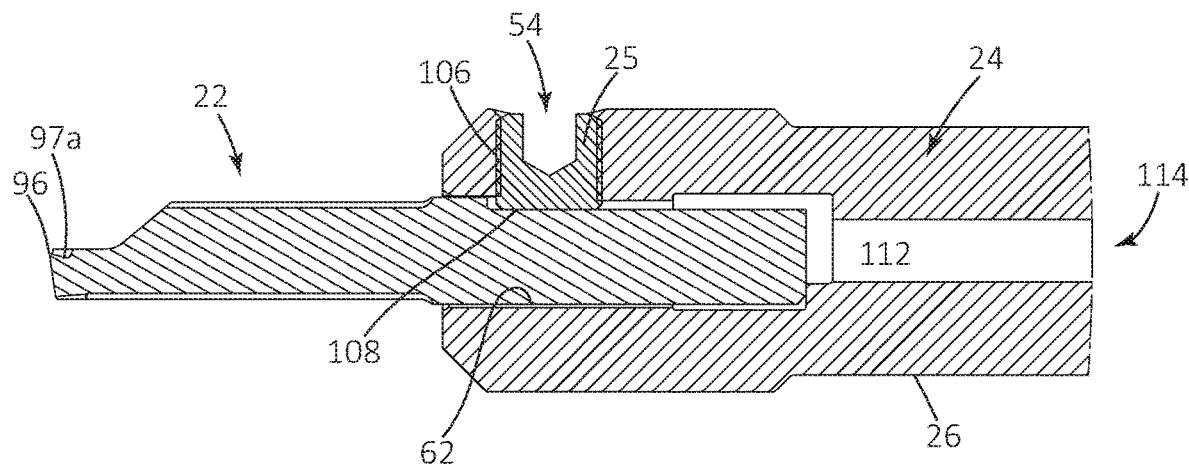
FIG. 10b is a cross-sectional view of the cutting tool taken along the line Xb-Xb in FIG. 9.
Figure 11:
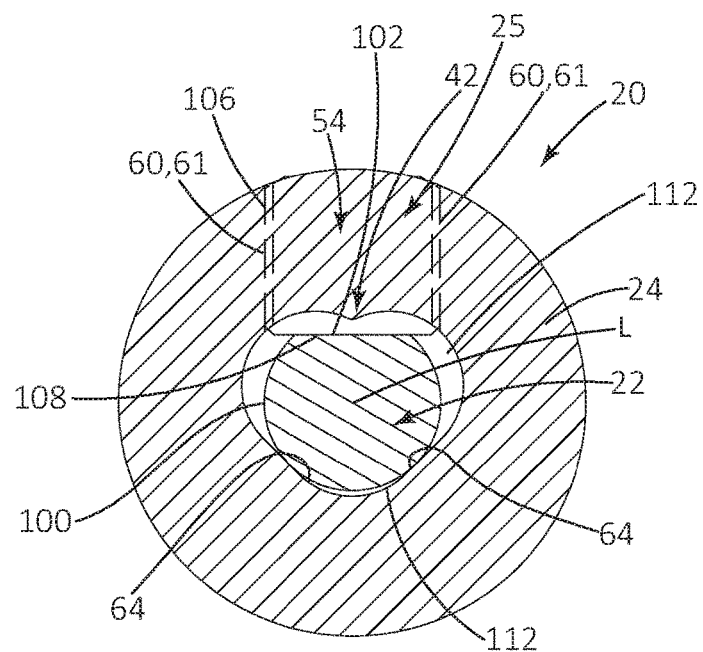
FIG. 11 is a cross-sectional view of the cutting tool taken along line XI-XI in FIG. 10a, with the through hole contour lines superimposed thereupon, and showing the entire radial cross-section of the insert holder, the insert and the fastening member.

Referring to FIGS. 9-11, in the fastened position of the cutting tool 20, the cutting insert 22 is releasably attached to the insert holder 24 by a fastening member 25. Specifically, the insert shank portion 92 is located in the insert receiving recess 38 beyond the projection forward end portion 48 of the insert orientation projection 42 in the rearward direction $D_R$. The cutting insert 22 is releasably clamped in the insert receiving recess 38 by the fastening member 25 located in the fastening member through hole 54. In accordance with some embodiments of the subject matter of the present application, the external threaded portion 106 can be threadingly engaged with the internal threaded portion 58. Each recess abutment surface 64 can abut a respective portion of the insert shank cylindrical surface 100. The fastening member 25 can abut a portion of the insert shank flat surface 102. Preferably, the fastening member end abutment surface 108 can form a surface-to-surface contact with the insert shank flat surface 102 thereby providing a precise center-height position for the cutting insert 22. The insert longitudinal axis A can be co-incident with the recess axis L (and the holder longitudinal axis B).

It is noted that the fastened position of the cutting tool 20 is not a shrink fit coupling as disclosed, for example, in U.S. Pat. Nos. 8,656,573 and 9,254,525. Accordingly, the cutting tool 20 is a non-shrink-fit cutting tool, and the insert 22 and the insert holder 24 form a non-shrink fit coupling.

It is also noted that cutting inserts with insert shank portions having differing diameters can be mounted to the same insert holder 24. That is, even if a smaller diameter shank is inserted, the fastening member 25 would be further threaded into the fastening member through hole 54, until finally reaching and engaging the flat surface 102, and clamp the insert 22 into contact with the recess abutment surfaces 64.

Referring to FIGS. 8a, 8b and 11, in accordance with some embodiments of the subject matter of the present application, in the fastened position of the cutting tool 20, the cutting tool 20 can include at least one coolant channel 112 formed by a gap 123 between the insert peripheral surface 88 and the recess peripheral surface 40. The coolant channel 112 has the purpose to direct cooling fluid to the cutting edge 96. The at least one coolant channel 112 includes a coolant channel inlet opening 114 where cooling fluid enters the coolant channel 112. The coolant channel outlet opening 116 can be located at the holder rearward end surface 29. The at least one coolant channel 112 also includes a coolant channel outlet opening 116 where cooling fluid exits the coolant channel 112. The coolant channel inlet opening 114 and the coolant channel outlet opening 116 are in fluid communication with each other. The coolant channel outlet opening 116 can be located at the holder forward end surface 28. It is noted that in such an embodiment the insert receiving recess 38 is a through hole in which the insert receiving recess 38 opens out to the holder rearward end surface 29.

By virtue of the aforementioned overlapping of the insert orientation projection angular extent PE and the through hole angular extent TE, the fastening member 25, when actuated, moves freely through the insertion cut-out 104 and initially abuts the insert shank flat surface 102 (or the intersection of the insert shank flat surface 102 and the insert shank cylindrical surface 100. Further actuation of the fastening member 25 urges the cutting insert 22 to rotate about the insert longitudinal axis A. It is noted that the fastening member 25 does not initially abut the shank cylindrical surface 100, which would not result in the aforementioned rotation. In the configuration where the fastening member end abutment surface 108 is planar, the cutting insert 22 rotates until a surface to surface contact is realized between fastening member end abutment surface 108 and the insert shank flat surface 102, which provides secure clamping.

Although the subject matter of the present application has been described to a certain degree of particularity, it should be understood that various alterations and modifications could be made without departing from the spirit or scope of the invention as hereinafter claimed.

What is claimed is:

1. An elongated insert holder (24) having a holder longitudinal axis (B) defining opposite forward to rearward directions ($D_F$, $D_R$), the insert holder (24) comprising:
a holder peripheral surface (26) extending circumferentially about the holder longitudinal axis (B), the holder peripheral surface (26) intersecting, and forming a boundary of, a holder forward end surface (28) at a forward end of the insert holder (24);
a holder shank portion (30) and an insert mounting portion (32) located at a forward end thereof, the insert mounting portion (32) comprising:
an insert receiving recess (38) extending along a recess axis (L) and opening out to the holder forward end surface (28), the insert receiving recess (38) comprising a recess peripheral surface (40) extending circumferentially about the recess axis (L) and an insert orientation projection (42) projecting from the recess peripheral surface (40) into the insert receiving recess (38); and
a fastening member through hole (54) opening out to the holder peripheral surface (26) and to the recess peripheral surface (40) and comprising a through hole peripheral surface (56) extending therebetween, wherein:
in a first recess cross-sectional view taken in a first recess radial plane (RP') through the through the fastening member through hole (54):
the through hole peripheral surface (56) forms a through hole contour (60) comprising two opposing through hole contour lines (61); and
the through hole contour lines (61) intersect the recess peripheral surface (40) at two through hole points (TP), the two through hole points (TP) defining a through hole angular extent (TE) about the recess axis (L); and
in a second recess cross-sectional view taken in a second recess radial plane ($RP_2$) through the insert orientation projection (42):
the insert orientation projection (42) has an insert orientation projection angular extent (PE) about the recess axis (L); wherein:
the second recess radial plane ($RP_2$) is axially rearward of the first recess radial plane ($RP_1$); and
the insert orientation projection angular extent (PE) at least partially angularly overlaps the through hole angular extent (TE) about the recess axis (L).

2. The insert holder (20), according to claim 1, wherein:
the fastening member through hole (54) has a through hole width (W) measured between two opposing through hole contour lines (61); and
the through hole width (W) is greatest at the first recess radial plane ($RP_1$).

3. The insert holder (24), according to claim 1, wherein:
the insert receiving recess (38) has an imaginary outer cylinder (OC) centered at the recess axis (L) and touching a portion of the insert receiving recess (38) furthest from the recess axis (L);
the insert receiving recess (38) has an imaginary inner cylinder (IC) which is concentric with the imaginary outer cylinder (OC) and touches a portion of the insert receiving recess (38) closest to the recess axis (L); and
in at least one of the first and second recess cross-sectional views, the area bounded between the imaginary inner and outer cylinders (IC, OC) forms an annular area (AA), the majority thereof being void.

4. The insert holder (24), according to claim 3, wherein 70% of the annular area (AA) is void.

5. The insert holder (24), according to claim 3, wherein the imaginary inner cylinder (IC) touches only the insert orientation projection (42).

6. The insert holder (24), according to claim 1, wherein:
the insert orientation projection (42) comprises two projection side surfaces (44a, 44b); and
in at least one of the first and second recess cross-sectional views, the two projection side surfaces (44a, 44b) converge towards each other in a direction from the recess peripheral surface (40) towards the recess axis (L).

7. The insert holder (24), according to claim 6, wherein the insert orientation projection angular extent (PE) is defined by the two projection points (PP), the two projection points (PP) being the points at which the two projection side surfaces (44a, 44b) begin to deviate from the imaginary outer cylinder (OC) as they converge towards each other.

8. The insert holder (24), according to claim 6, wherein in at least one of the first and second recess cross-sectional views, the two projection side surfaces (44a, 44b) are concavely curved.

9. The insert holder (24), according to claim 6, wherein the two projection side surfaces (44a, 44b) intersect each other at a projection ridge (46) which extends along the recess axis (L).

10. The insert holder (24), according to claim 6, wherein the projection ridge (46) is parallel to the recess axis (L).

11. The insert holder (24), according to claim 1, wherein:
the insert orientation projection angular extent (PE) has a projection extent angle (a) at the recess axis (L); and
the projection extent angle (a) is greater or equal to 70° and less than or equal to 110°.

12. The insert holder (24), according to claim 11, wherein the insert orientation projection (42) is mirror symmetrical about an axial bisector plane (BP) containing the recess axis (L) and bisecting the projection extent angle (a).

13. The insert holder (24), according to claim 1, wherein the insert orientation projection (42) is axially spaced apart from the holder forward end surface (28).

14. The insert holder (24), according to claim 1, wherein the fastening member through hole (54) opens out to the recess peripheral surface (40) adjacent the insert orientation projection (42).

15. The insert holder (24), according to claim 14, wherein:
the insert orientation projection (42) comprises projection forward and rearward end portions (48, 50) and a projection middle portion (52) extending therebetween, the projection forward end portion (48) being located closer to the holder forward end surface (28) than the projection rearward end portion (50); and
the fastening member through hole (54) opens out to the recess peripheral surface (40) adjacent the projection forward end portion (48).

16. The insert holder (24), according to claim 1, wherein the insert orientation projection (42) is integrally formed with the insert holder (24) to have unitary one-piece construction therewith.

17. The insert holder (24), according to claim 1, comprising exactly one fastening member through hole (54) opening out to the holder peripheral surface (26) and the recess peripheral surface (40).

18. The insert holder (24), according to claim 1, wherein the insert receiving recess (38) comprises a plurality of recess abutment projections (62) projecting from the recess peripheral surface (40) opposite the fastening member through hole (54), the plurality of recess abutment projections (62) being angularly spaced apart from each other and the insert orientation projection (42) about the recess axis (L), each recess abutment projection (62) comprising a recess abutment surface (64).

19. The insert holder (24), according to claim 18, wherein the plurality of recess abutment projections (62) extend in the forward direction ($D_F$) towards the holder forward end surface (28).

20. The insert holder (24), according to claim 18, wherein each recess abutment surface (64) is planar.

21. The insert holder (24), according to claim 18, wherein the recess abutment surfaces (64) extend in the forward-to-rearward direction ($D_F$, $D_R$), along the recess axis (L).

22. The insert holder (24), according to claim 18, wherein the plurality of recess abutment projections (62) comprise exactly two recess abutment projections (62).

23. The insert holder (24), according to claim 22, wherein in an end view of the insert holder (24), the exactly two recess abutment surfaces (64) form an abutment clamping angle ((3) therebetween, the abutment clamping angle ((3) being greater than 45° and less than 135°.

24. The insert holder (24), according to claim 1, wherein the through hole peripheral surface (56) comprises an internal threaded portion (58).

25. The insert holder (24), according to claim 1, wherein the holder shank portion (30) comprises at least one shank peripheral coupling arrangement (34), each shank peripheral coupling arrangement (34) comprising two pairs of diametrically opposite planar shank peripheral abutment surfaces (36) located on the holder peripheral surface (26), members of each pair being parallel to each other and to the holder longitudinal axis (B).

26. The insert holder (24), according to claim 25, wherein the at least one shank peripheral coupling arrangement (34) comprises exactly two shank peripheral coupling arrangements (34) oriented at 90° to each other about the holder longitudinal axis (B).

27. A cutting tool (20) comprising:
an insert holder (24) in accordance with claim 1; and
a cutting insert (22) elongated along an insert longitudinal axis (A) and comprising an insert cutting portion (90) and an insert shank portion (92) axially offset therefrom, wherein:
the cutting tool (20) is adjustable between:
an initial position in which:
the cutting insert (22) is spaced apart from, and axially aligned with, the insert holder's insert receiving recess (38), and
a fastened position in which:
the insert shank portion (92) is located in the insert receiving recess (38) beyond a projection forward end portion (48) of the insert orientation projection (42) in the rearward direction ($D_R$); and the cutting insert (22) is releasably clamped in the insert receiving recess (38) by a fastening member (25) located in the fastening member through hole (54).

28. The cutting tool (20), according to claim 27, wherein:
the fastening member through hole (54) comprises an internal threaded portion (58);
the fastening member (25) comprises an external threaded portion (106); and
in the fastened position of the cutting tool (20), the external threaded portion (106) is threadingly engaged with the internal threaded portion (58).

29. The cutting tool (20), according to claim 27, wherein:
the cutting insert (22) comprises two insert end surfaces (86) and an insert peripheral surface (88) extending therebetween about the insert longitudinal axis (A), the insert peripheral surface (88) at the insert shank portion (92) comprising:
a planar insert shank flat surface (102) which extends to the insert end surface (86) that is located opposite the insert cutting portion (90) thereby forming an insertion cut-out (104); and
an insert shank cylindrical surface (100) which lies on an imaginary shank cylinder and which connects opposite circumferential extremities of the insert shank flat surface (102).

30. The cutting tool (20), according to claim 29, wherein the insert shank flat surface (102) is parallel to the insert longitudinal axis (A).

31. The cutting tool (20), according to claim 29, wherein:
the insert orientation projection (42) is axially spaced apart from the holder forward end surface (28);
the cutting tool (22) is further adjustable to a partially inserted position between the initial position and the fastened position, and in the partially inserted position;
the insert shank portion (92) is partially inserted in the insert receiving recess (38) up to a projection forward end portion (48) of the insert orientation projection (42) in the rearward direction ($D_R$).

32. The cutting tool (20), according to claim 29, wherein:
the cutting tool (22) is further adjustable to an inserted position between the initial position and the fastened position, and in the inserted position:
the insertion cut-out (104) is angularly aligned with the insert orientation projection (42) about the recess axis (L); and
the insert shank portion (92) is located in the insert receiving recess (38) beyond a projection forward end portion (48) of the insert orientation projection (42) in the rearward direction ($D_R$).

33. The cutting tool (20), according to claim 29, wherein:
the insert receiving recess (38) comprises a plurality of recess abutment projections (62) projecting from the recess peripheral surface (40) opposite the fastening member through hole (54), the plurality of recess abutment projections (62) being angularly spaced apart from each other and the insert orientation projection (42) about the recess axis (L), each recess abutment projection (62) comprising a recess abutment surface (64); and
in the fastened position of the cutting tool (20):
each recess abutment surface (64) abuts a respective portion of the insert shank cylindrical surface (100); and
the fastening member (25) abuts a portion of the insert shank flat surface (102).

34. The cutting tool (20), according to claim 27, wherein:
in the fastened position of the cutting tool (20), the cutting tool (20) comprises at least one coolant channel (112) formed by a gap (123) between the insert peripheral surface (88) and the recess peripheral surface (40); and
the at least one coolant channel (112) comprises a coolant channel inlet opening (114) and a coolant channel outlet opening (116) which are in fluid communication with each other.

35. The cutting tool (20), according to claim 34, wherein the coolant channel outlet opening (116) is located at the holder forward end surface (28).

36. The cutting tool (20), according to claim 27, wherein the cutting tool (20) is a non-rotary boring bar.

37. An elongated insert holder (24) having a holder longitudinal axis (B) defining opposite forward to rearward directions ($D_F$, $D_R$), the insert holder (24) comprising:
- a holder peripheral surface (26) extending circumferentially about the holder longitudinal axis (B), the holder peripheral surface (26) intersecting, and forming a boundary of, a holder forward end surface (28) at a forward end of the insert holder (24);
- a holder shank portion (30) and an insert mounting portion (32) located at a forward end thereof, the insert mounting portion (32) comprising:
  - an insert receiving recess (38) extending along a recess axis (L) and opening out to the holder forward end surface (28), the insert receiving recess (38) comprising a recess peripheral surface (40) extending circumferentially about the recess axis (L) and an insert orientation projection (42) projecting from the recess peripheral surface (40) into the insert receiving recess (38); and
  - a fastening member through hole (54) opening out to the holder peripheral surface (26) and to the recess peripheral surface (40) and comprising a through hole peripheral surface (56) extending therebetween, wherein:
    in a first recess cross-sectional view taken in a first recess radial plane ($RP_1$) through the fastening member through hole (54):
    - the through hole peripheral surface (56) forms a through hole contour (60) comprising two opposing through hole contour lines (61);
    - a minor peripheral portion (63) of the recess peripheral surface (40) is seen extending between the two opposing through hole contour lines (61); and
    - the insert orientation projection (42) is formed on at least a portion of the minor peripheral portion (63).

38. The insert holder (20), according to claim 37, wherein the insert orientation projection (42) is formed over the entire minor peripheral portion (63).

39. The insert holder (20), according to claim 37, wherein:
the fastening member through hole (54) has a through hole width (W) measured between two opposing through hole contour lines (61); and
the through hole width (W) is greatest at the first recess radial plane ($RP_1$).

* * * * *